United States Patent [19]

Nakagawa et al.

[11] Patent Number: 5,465,827
[45] Date of Patent: Nov. 14, 1995

[54] TRANSPORT ARRANGEMENT FOR MOVABLE MEMBERS

[75] Inventors: Susumu Nakagawa, Kobe; Nobuhiro Hayashi, Uji; Hiroshi Nakagawa, Toyonaka, all of Japan

[73] Assignee: Daifuku Co., Ltd., Osaka, Japan

[21] Appl. No.: 375,263

[22] Filed: Jan. 19, 1995

Related U.S. Application Data

[63] Continuation of Ser. No. 233,127, Apr. 26, 1994, abandoned.

[51] Int. Cl.$^6$ ................................... B65G 37/00
[52] U.S. Cl. .................. 198/465.3; 198/580; 198/803.2; 104/168
[58] Field of Search ............... 198/465.1, 465.2, 198/465.3, 580, 795, 803.01, 803.2; 104/165, 163, 168

[56] References Cited

U.S. PATENT DOCUMENTS

| | | | |
|---|---|---|---|
| 4,515,264 | 5/1985 | Sticht | 198/465.2 X |
| 4,564,100 | 1/1986 | Moon | 198/341 |
| 4,850,472 | 7/1989 | Liebel et al. | 198/465.3 X |
| 5,012,917 | 5/1991 | Gilbert et al. | 198/795 X |
| 5,067,413 | 11/1991 | Kiuchi et al. | 104/168 |
| 5,195,629 | 3/1993 | Gottstein et al. | 198/465.3 X |
| 5,201,403 | 4/1993 | Haas, Sr. et al. | 198/580 X |
| 5,213,195 | 5/1993 | Sticht | 198/465.1 X |

FOREIGN PATENT DOCUMENTS

| | | | |
|---|---|---|---|
| 1287598 | 6/1962 | Germany . | |
| 0169406 | 6/1990 | Japan | 198/465.3 |
| 2-209309 | 8/1990 | Japan . | |
| 5-162839 | 6/1993 | Japan . | |

Primary Examiner—James R. Bidwell
Attorney, Agent, or Firm—Barnes, Kisselle, Raisch, Choate, Whittemore & Hulbert

[57] ABSTRACT

A movable member supported for movement on a track has a pressure receptor portion which faces laterally outward. An accelerating device in a horizontally held particular track portion of the track, at the upstream side thereof, acts upon the pressure receptor portion to apply high speed transport force to the movable member. A decelerating device at the downstream side of the particular track portion acts upon the pressure receptor portion to decelerate the movable member. The accelerating device acts upon the pressure receptor portion at the downstream side of the particular track portion, whereby high speed transport force is applied to the movable member so that the movable member may be transported at high speed on the horizontally held particular track portion. The decelerating device acts upon the pressure receptor portion of the movable member being transported at high speed, whereupon the movable member is decelerated. Movable members can be efficiently transported at high speed on the particular track portion and, therefore, the number of movable members present in the particular track portion can be reduced.

6 Claims, 8 Drawing Sheets

TRANSPORT ARRANGEMENT FOR MOVABLE MEMBERS

This is a continuation of application Ser. No. 08/233,127 filed on Apr. 26, 1994, now abandoned.

FIELD OF THE INVENTION

This invention relates to a movable member transport arrangement for use in transporting non-driven movable members, such as trucks or pallets, on a predetermined track provided, for example, on the floor.

BACKGROUND OF THE INVENTION

Hitherto, there has been proposed an arrangement for transporting non-driven trucks on a predetermined track, as disclosed in, for example, Japanese Patent Application Laid-Open No. 2-209309.

This prior art arrangement includes a predetermined track on which movable members are free to move, a movable-member transport device disposed in an upstream portion of the predetermined track, a brake device disposed in a downstream portion of the track, and another movable-member transport device disposed downstream of the brake device for transport to a next stage. Each movable-member transport device consists of a pair of feed rollers, right and left, abuttable to sides of each movable member, and a rotary drive device for imparting a forward rotational force to the feed rollers. The brake device consists of a pair of brake rollers, right and left, abuttable to sides of each movable member, and a torque motor for imparting a reverse rotational force to the brake rollers. The forward rotational force is set greater than the reverse rotational force.

According to such prior art arrangement, the feed rollers which are in abutment with the sides of the movable member are forcibly rotated by the rotary drive device to apply large propulsive force to the movable member, whereby the movable member which carries thereon an object to be transported can be transported on the predetermined track. In this case, the movable member goes into abutment against an immediately preceding movable member which is at a halt, so that a series of movable members including that immediately preceding one is pushed forward for being transported.

At a downstream location on the predetermined track, the brake rollers which are in reverse rotation are in abutment with the sides of a movable member and accordingly a reverse propulsive force acts upon this movable member. Since the forward rotational force is greater than the reverse rotational force, the brake rollers are rotated forward while being subjected to a braking force corresponging to the difference between the forward and reverse rotational forces. Thus, movable members on the downstream side are transported with a braking force applied thereto, so that the series of movable members is transported while being sequentially pushed from behind in closedly connected condition, without any gap created between adjacent movable members.

In the course of such transportation, various operations, such as part fitting and assembling, are carried out with respect to the object being transported. Each movable member as pushed forward by the brake device is similarly transported by the next movable-member transport device to the next stage of operation.

According to this prior art arrangement, movable members are sequentially transported forward by a plurality of movable-member transport devices on the predetermined track which is held in horizontal condition. Therefore, the speed of movable member transport is generally constant and accordingly various operations required with respect to objects being transported can be conveniently carried out. However, transport at constant speed means inefficient transport, for example, in a track portion in which no particular operation is carried out. Further, the fact that movable members are transported in closely spaced relation over almost the entire length of the predetermined track necessitates a large number of costly movable members, resulting in high cost of equipment. Especially where the predetermined track is exceptionally long, an excessively large number of movable members is required, which results in further increase in the cost of equipment. In addition, the fact that the predetermined track, inclusive of the non-operating track portion, is loop-shaped in plan view means that the planar space occupied by the entire arrangement is considerably large, which is very inconvenient from the standpoint of space economy.

DISCLOSURE OF THE INVENTION

Therefore, the object of this invention is to provide a transport arrangement for movable members which can perform high speed transport (return transport) of movable members in a particular track portion held in horizontal condition, such as nonoperating track portion, and which requires less space for installation of the entire equipment involved.

In order to accomplish the above object, the movable-member transport arrangment in accordance with the invention comprises a movable member supported and guided by guide means for movement on a predetermined track, the movable member having a pressure receptor portion formed thereon which faces sidewardly outward, accelerating means disposed in a horizontally held particular track portion of the predetermined track, at the upstream side thereof, the accelerating means being adapted to act upon the pressure receptor portion to apply high speed transport force to the movable member, and decelerating means disposed at the downstream side of the particular track portion to act upon the pressure receptor portion to decelerate the movable member.

According to such arrangement of the invention, as the movable member is positioned opposite to the accelerating means at the upstream side of the horizontally held particular track portion, the accelerating means is caused to act upon the pressure receptor portion, whereby high speed transport force is applied to the movable member so that the movable member may be transported at high speed on the particular track portion. The decelerating means is caused to act upon the pressure receptor portion of the movable member which has been transported at high speed, whereupon the movable member is decelerated. In this way, movable members can be efficiently transported at high speed in the horizontally held particular track portion and, therefore, the number of movable members present in the particular track portion can be reduced. Thus, it is possible to reduce the required number of costly movable members and accordingly reduce the cost of equipment.

In a first preferred mode of the invention, relay means for applying high speed transport force to the movable member after the movable member being decelerated is provided in the horizontally held particular track portion and between the accelerating means and the decelerating means. According to this arrangement, the movable member thrusted forward from the accelerating means is again subjected to high speed transport force at the relay means, so that the movable member can be transported in a relayed fashion throughout the particular track portion.

In a second preferred mode of the invention, the predetermined track includes an operating track portion and a horizontally held non-operating track portion, with accelerating means disposed at the upstream side of the non-operating track portion and decelerating means disposed at the downstream side thereof. According to this arrangement, movable members can be efficiently transported (return-transported) at high speed, so that movable members present in the non-operating track portion can be reduced in number.

In a third preferred mode of the invention, the predetermined track is a loop-shaped track consisting of an operating track portion and a horizontally held non-operating track portion which are arranged in vertically spaced parallel relation, and vertically extending transfer track portions which connect respective beginning and ending terminals of the operating and non-operating track portions, with accelerating means disposed at the upstream side of the non-operating track portion and decelerating means disposed at the downstream side thereof. According to this arrangement, the operating track portion and the non-operating track portion are positioned one over the other when viewed in plan, so that the planar dimensional space occupied by the equipment involved is reduced.

In a fourth preferred mode of the invention, stopper means adapted for abutment by the movable member is disposed on the downstream side of the decelerating means. According to this arrangement, the movable member, after being decelerated by the decelerating means, may be halted in place by the stpper means.

In a fifth preferred mode of the invention, pressure receptor portions are formed on both sides of the movable member, and accelerating means and decelerating means which act upon the pressure receptor portions are disposed in spaced apart relation on both sides of the particular track portion. According to this arrangement, the movable member is pressed from opposite sides when acted upon by the accelerating means or decelerating means, so that movement of the movable member can be accelerated or decelerated steadily without deflection.

In a sixth preferred mode of the invention, the accelerating means and the decelerating means each have a pair of drive rollers disposed on opposite sides, right and left. According to this arrangement, it is possible to apply drive force to the movable member from opposite sides.

In a seventh preferred mode of the invention, the accelerating means and the decelerating means each have a drive roller disposed on one side and a freely rotatable roller disposed on opposite side thereto. According to this arrangement, drive force can be applied to the movable member by the one side drive roller, with the movable member being pressed by the one side drive roller and freely rotatable roller from opposite sides.

DESCRIPTION OF THE PREFERRED EMBODIMENT

One embodiment of the invention will now be described with reference to the accompanying drawings.

Referring to FIGS. 1 to 5, a pair of rails 1, shown as one example of guide means, is laid on a base frame 2 formed on the floor, the rails 1 defining a predetermined track 3. The predetermined track 3 comprises a linearly extending operating track portion 3A positioned at an upper level, a linearly extending horizontal non-operating track portion 3B positioned at a lower level, and vertically extending transfer track portions 3C, 3D which connect respective beginning and ending terminals of the two track portions 3A, 3B, the predetermined track B being thus configured to be of loop shape in side elevation. The nonoperating track portion 3B represents one example of a particular track portion.

A movable member 10, shown in the form of a truck, includes a body 11, and pluralities of front and rear wheels 12 carried on the underside of the body 11 at both sides thereof, through which wheels 12 the movable member 10 is mounted on the rails 1 for movement on the predetermined track 3. A support 13 for an object to be transported is vertically movably disposed on the body 11. The body 11 has pressure receptor portions 12 formed thereon at opposite sides, and abutment faces 15 formed on its front and rear surfaces.

Figure 1:
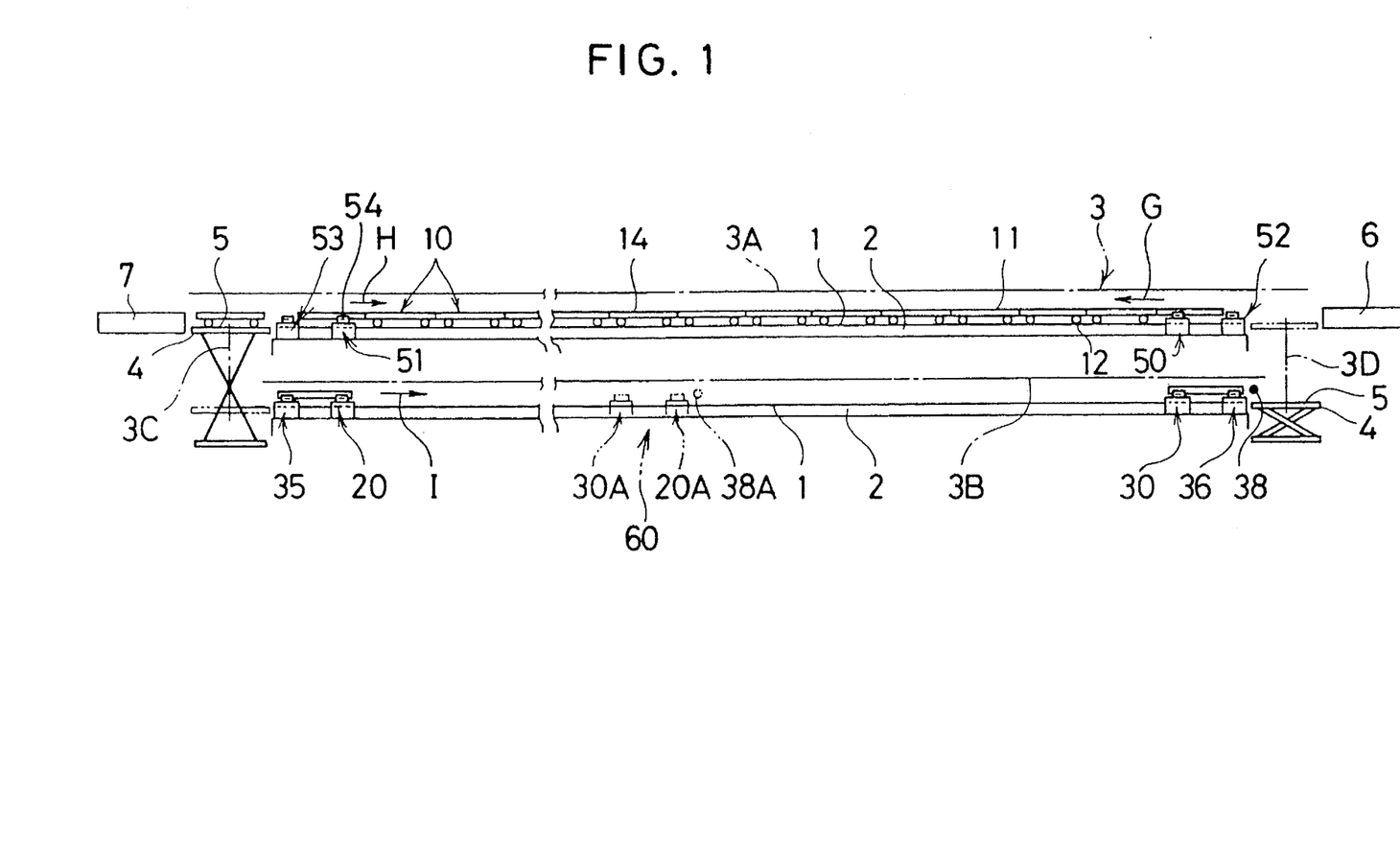
FIG. 1 is a schematic side view of a movable member transport arrangement representing one embodiment of the present invention.
Figure 2A:
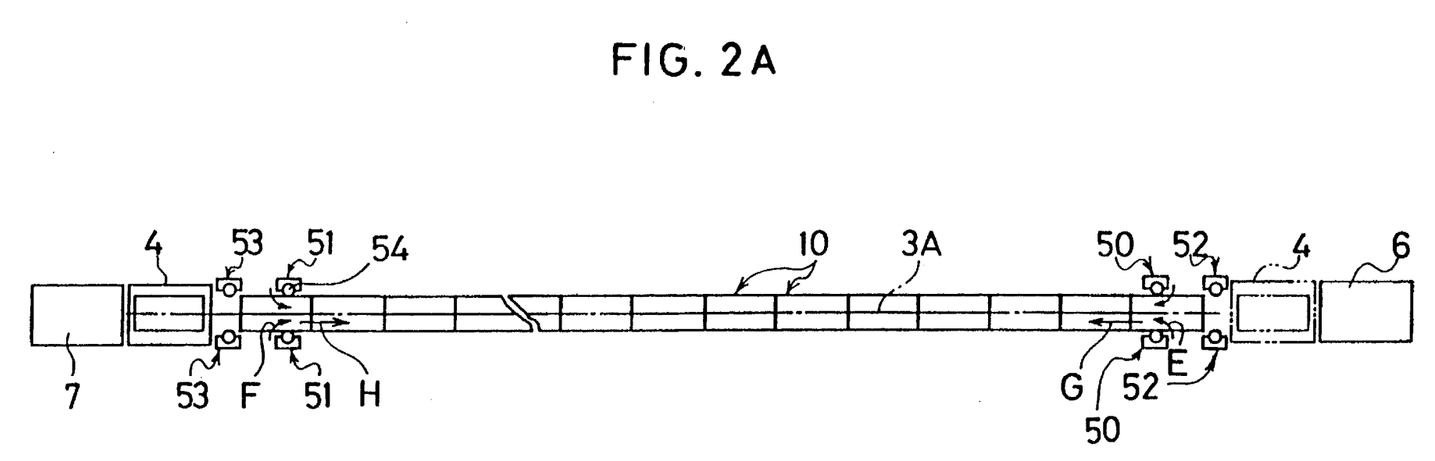
FIG. 2A is a schematic plan view of the movable member transport arrangement, with an operating track portion shown in (A) and a non-operating track portion is shown in FIG. 2B.
Figure 2B:
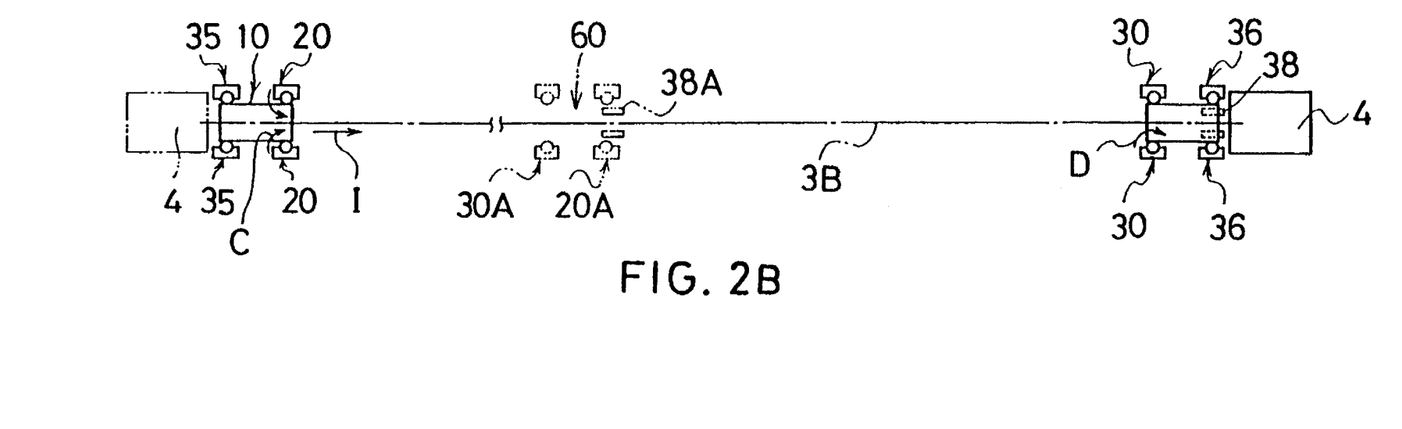

In the non-operating track portion 3B, at an upstream side thereof, there is disposed an accelerating device 20 adapted to act on the pressure receptor portion 14 to apply high speed transport force to the movable member 10 and, at a downstream side of the track portion 3B, there is disposed a decelerating device 30 adapted to act on the pressure receptor portion 14 to decelerate the movable member 10. Lead-in devices 35, 36 are respectively disposed slightly upstream of the accelerating device 20 and slightly downstream of the decelerating device 30. The foregoing devices 20, 30, 35, 36 are all disposed in symmetrical pairs, right and left. A stopper device 38 adapted for abutment with each abutment face 15 of the movable member 10 is provided adjacent the downstream side lead-in device 36.

Nextly, the accelerating device 20 will be explained in detail with reference to FIGS. 1, 2A, 2B and 7. A vertical shaft 23 extends from the base frame 2 through a mount member 22. A support member 22 is pivotably supported on the vertical shaft 23 through a bearing. Mounted on this support member 22 is a servo motor 25 or an example of a rotation drive unit. A feed roller (an example of driving roller) 26 of, for example, urethane make is fixed to a vertical output shaft drawn from the servo motor 25. The servo motor 25 supplies high-speed forward rotation force C to the feed roller 26. A cylinder unit 27 for pivoting the support member 24 is disposed between the support member 24 and the base frame 2. Therefore, the cylinder unit 27 is actuated to pivot the support member 24 about the vertical axis in order to move the feed roller 26 toward and away from the pressure receptor portion 14.

Figure 3:
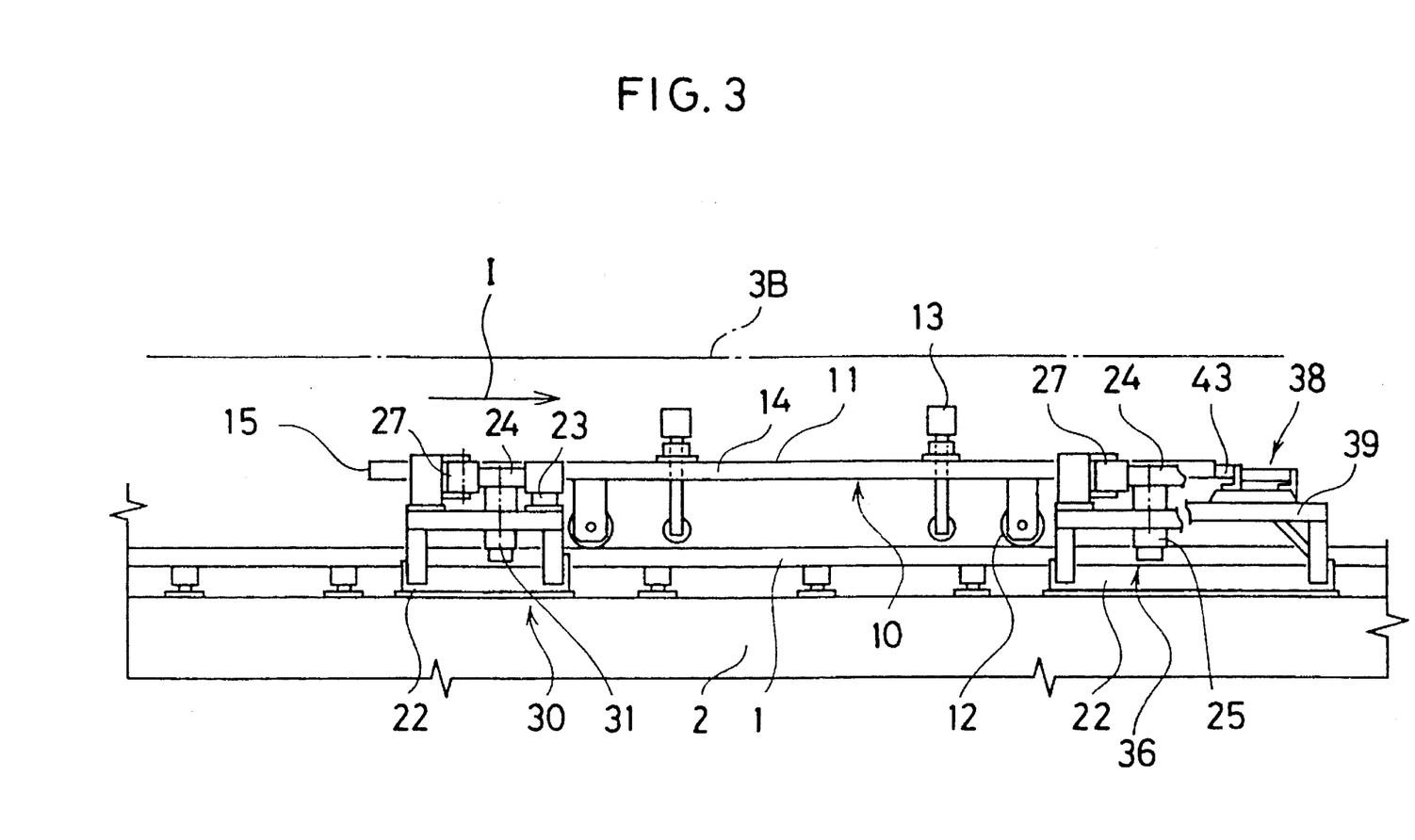
FIG. 3 is a side view showing a decelerating device in the non-operating track portion.
Figure 4:
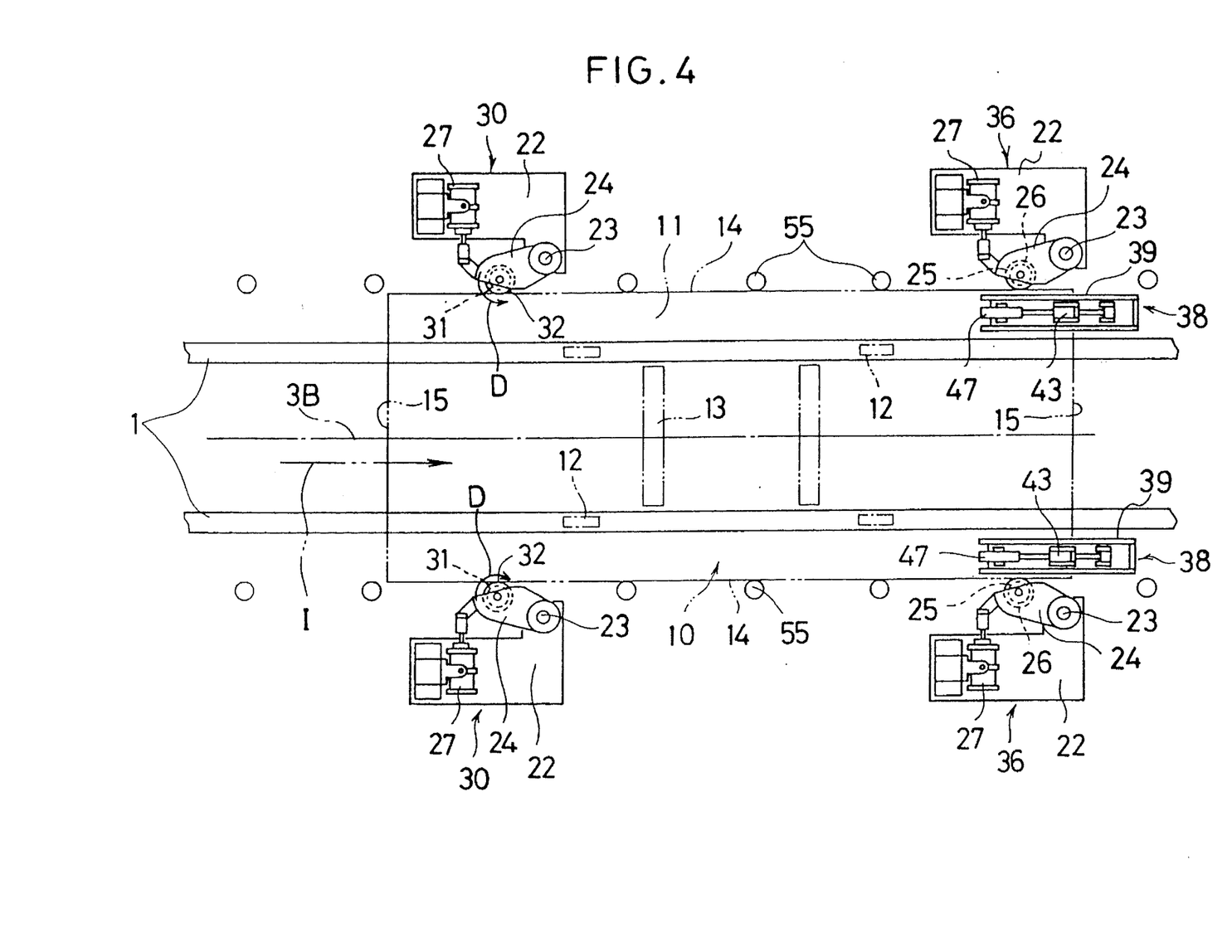
FIG. 4 is a plan view showing the decelerating device in the non-operating track portion.
Figure 5:
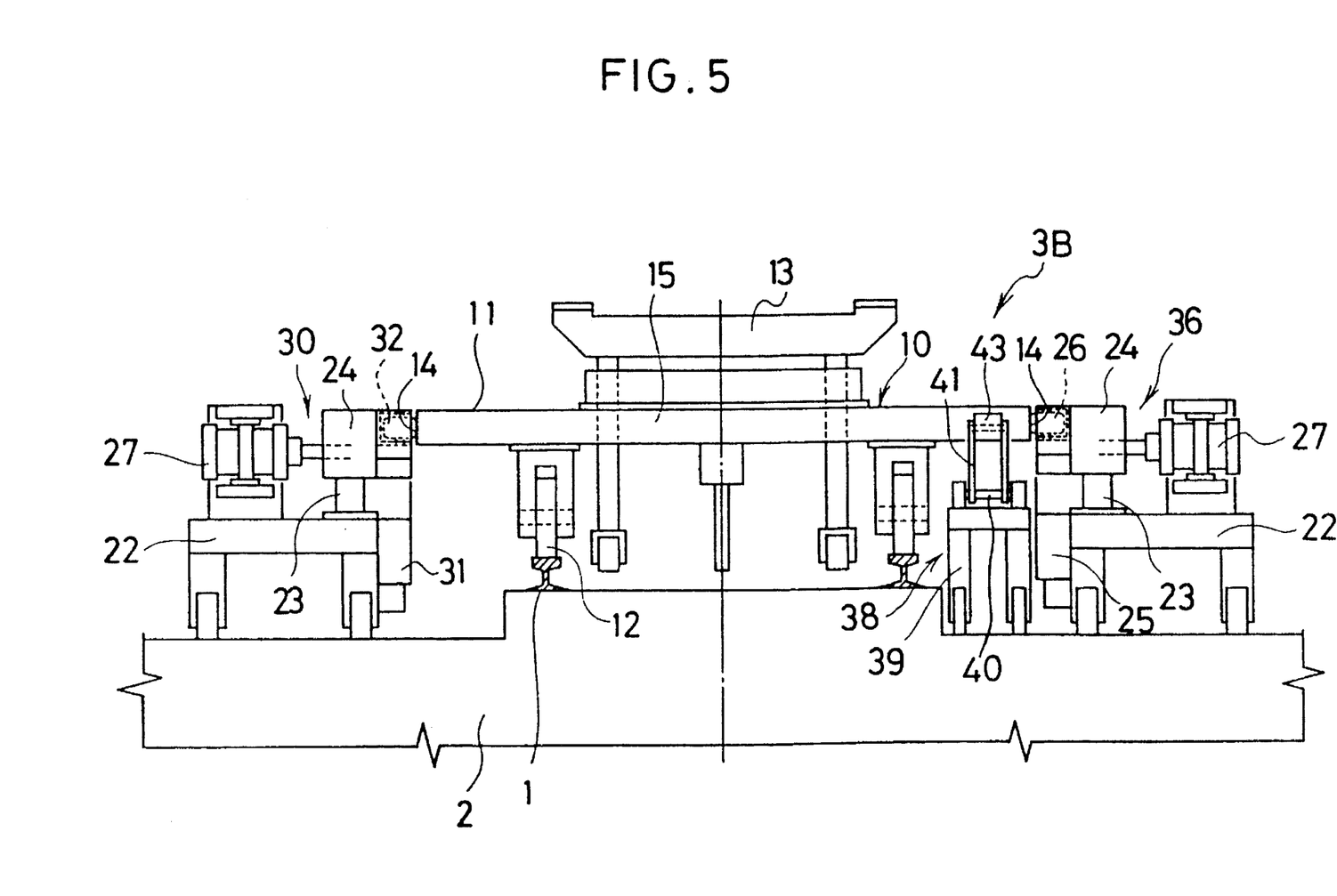
FIG. 5 is a front view showing the decelerating device in the non-operating track portion.

Referring to FIGS. 3 to 5, the decelerating device 30 is of same construction as the above described accelerating device 20, except that an air motor 31 is employed instead of the servo motor 25 for the accelerating device 20 and except that a decelerating roller (an example of drive roller) 32 is adapted to supply low-speed forward rotational force D. It is noted that like component members are designated by like reference numerals.

Figure 8:
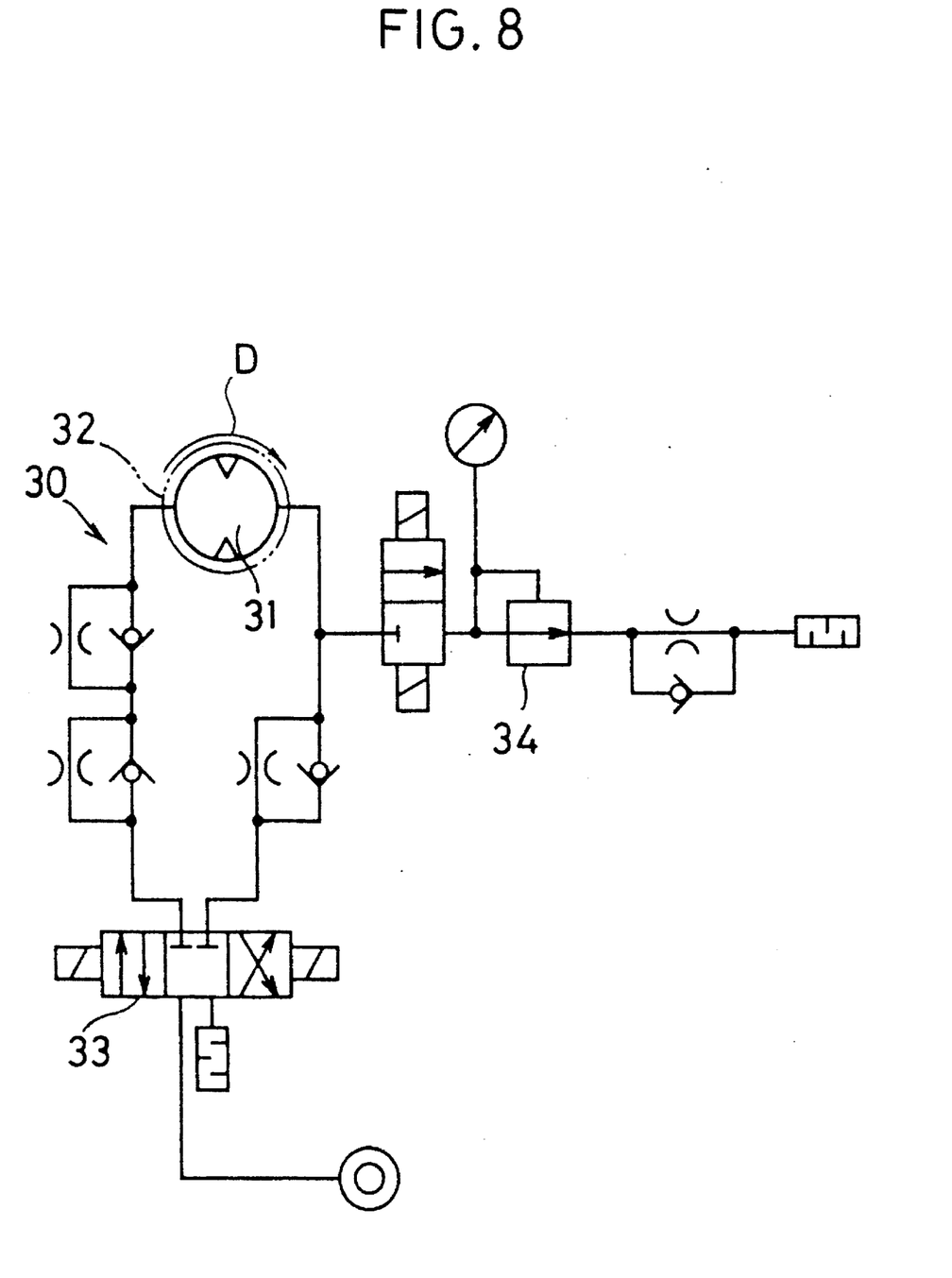
FIG. 8 is a piping system diagram for an air motor unit in the decelerating device.

The air motor 31, as shown in FIG. 8, is normally in a non-rotation state, with a selector valve 33 kept neutral. When the pressure receptor portion 14 of a movable member 10 which has been transported at high speed goes into abutment against the decelerating roller 32, air is discharged through a relief valve 34 while the decelerating roller 32 is kept in rotation, whereby the moving energy of the movable member 10 is absorbed for deceleration of the movable member 10. A switching of the selector valve 33 brings the decelerating roller 32 into forced rotation to produce low-speed forward rotation force D. The lead-in devices 35, 36 are of the same construction as the accelerating device 20; therefore, like component members are designated by like reference numerals.

In FIGS. 3 to 6, the stopper device 38 includes a pair of links 41, front and rear, collapsibly attached to a bracket 39 via a transverse shaft 40, and a stopper element 43 coupled between free ends of the links 41 via a transverse pin 42. One of the links 41 has a cam face 44 formed on the underside thereof. A cam roller 45 adapted to act upon the cam face 44 is mounted to a reciprocal element 46 which is driven by a cylinder device 47 for back and forth movement. In FIGS. 1 and 2A and 2B, the operating track portion 3A is provided at its upstream portion with a forwarding device 50 for imparting transport force to movable member 10, and at its downstream portion with a braking device 51. Lead-in devices 52, 53 are disposed somewhat upstream of the forwarding device 50 and somewhat downstream of the braking device 51 respectively. The foregoing devices 50, 51, 52, 53 are all disposed in symmetrical pairs, right and left.

The forwarding devices 50 and lead-in devices 52, 53 are basically of same construction as aforesaid lead-in devices 35, 36. The braking devices 51 are also of similar construction, except that they are adapted to supply reverse rotation force F to a braking roller 54 against the low-speed forward rotation force E provided by the forwarding device 50, and except that the reverse rotation force F is smaller than the low-speed forward rotation force E.

In the transfer track portions 3C, 3D each there is provided a lift facility having an elevator unit 4, with transfer rails 5 laid on the top of the elevator unit 4, the transfer rails 5 being connectable to the rails 1. In the transfer track portion 3D which is intended for elevating movable member 10, at a topmost position thereof, there is disposed a loading device 6 for loading a load onto the movable member 10, in inwardly opposed relation to the movable member. Similarly, in the transfer track portion 3C which is intended for lowering movable member 10, at a topmost position thereof, there is disposed an unloading device 7 for unloading the load from the movable member 10, in inwardly opposed relation to the movable member. It is to be noted that at necessary locations alongside the predetermined track 3 there are arranged guide rollers 55 adapted to go into opposed relationship to aforesaid pressure receptor portions 14 (see FIGS. 4 and 7).

Nextly, operation of the arrangement according to the foregoing embodiment will be explained.

An empty movable member 10 is positioned on the elevator unit 4 which has reached the topmost position of the upward transfer track portion 3D. An object to be transported is fed from the loading device 6 onto the movable member 10. The movable member 10 is thrusted into the upstream portion of the operating track portion 3A as a feeder device (not shown) is operated, until its leading end enters the lead-in device 52, whereupon the movable member is brought to a stop.

Then, as FIGS. 1 and 2A show, when the forwarding device 50 is ready to receive the movable member, the lead-in device 52 is operated in same manner as will be described with respect to the forwarding device 50 to transport the movable member 10. In this case, the front abutment face 15 of the led-in movable member 10 goes into abutment with the rear abutment face 15 of the rear most one of a series of movable members 10 held in closely entrained condition in the operating track portion 3A so that the series of movable members 10 is transported under the lead-in force applied by the lead-in device 52.

The lead-in operation of the lead-in device 52 ends when the leading end of the corresponding movable member 10 enters the forwarding device 50. At this point of time, the cylinder unit 27 of the forwarding device 50 is extended to pivot the support member 22 outwardly about the vertical axis, so that the forwarding roller 26 is moved away from the corresponding pressure receptor portion 12. Thus, forwarding (transport) of movable member can be performed without any inconvenience.

After entry of movable member into position, the forwarding rollers 26 are operated reverse to move toward each other for abutment against pressure receptor portions 14. In this case, the forwarding rollers 26 are in rotation under the driving force of the servo motor 25. Therefore, when the forwarding rollers 26 which are in forced rotation are brought into abutment against the pressure receptor portions 14, the low-speed forward rotation force E of the rollers 26 is operative to apply a transport force to movable member 10, so that the movable member 10 is transported, as designated by the reference character G, on the operating track portion 3A while pushing from behind the series of movable members 10 held in closely entrained condition on the operating track portion 3A. The feed of movable members 10 by the forwarding device 50 is detected as by an encoder, so that when a predetermined feed is detected, the forwarding rollers 26 are caused to move away from each other to stop transport operation.

Upon reaching the downstream portion of the operating track portion 3A, a movable member 10 is subjected to braking action of the braking devices 51. When operation of the forwarding device 50 for transport of movable members 10 has been stopped, the cylinder device of the braking device 51 is contracted, so that the braking rollers 54 are away from each other. Conversely, when the forwarding device 50 begins forwarding operation, the brake rollers 54 are moved toward each other in response to the operation of the forwarding device 50, so that the brake rollers go into abutment against the corresponding pressure receptor portions 14. In this case, the brake rollers 54 are rotated in a direction opposite to the direction of rotatation of the forwarding rollers 26.

Torque motors are rotated so that the brake rollers 54 are brought into forced rotation in opposite directions. Therefore, when the brake rollers 54 in forced rotation are caused to abut against the pressure receptor portions 14, the reverse rotational force F thereof exerts upon movable member 10 a transport effort oriented toward a reverse direction H. Since the low-speed rotation force E is greater than the reverse rotation force F, the brake rollers 54 are rotated in the forward direction in corresponding relation to the difference between the rotation forces E and F. The load involved in this case is absorbed by the torque motors.

Thus, the movable member 10 which corresponds to the brake devices 51 on the downstream side is transported while being subjected to braking action. Therefore, between the forwarding device 50 and the brake device 51, a plurality of movable members 10 is densely aligned while being pushed from behind without any end-to-end gap being produced between adjacent movable members. Braking action of the brake device 51 is stopped about same time as transport under the action of the forwarding device 50 is stopped. While transport of movable members 10 in the operating track portion 3A is intermittently carried out or stopped in this way, an operator on the working floor or one assuming a working position on the body 11 may perform various necessary operations with respect to the object being transported.

Any movable member 10 pushed away from the braking devices 51 by being pushed from behind as above described is received by the forwarding device 53. In turn, the forwarding device 53 is actuated to transfer the movable member 10 onto the transfer rail 5 of the elevator unit 4 at the topmost position in the downward transfer track portion 3C. The object on the movable member 10 is removed by the unloading device 7, and the emptied movable member 10 is transferred downward along the transfer track portion 3C as the elevator unit 4 is lowered.

As a feeder device (not shown) is operated, the movable member 10 on the elevator unit 4 is forced into the upstream portion of the horizontal non-operating track portion 3B until its front end enters the lead-in device 35, whereupon the operation of the feeder is stopped. Then, when the accelerating device 20 is ready to allow the entry of the movable member 10, the lead-in device 35 is operated in same manner as the accelerating device 20 to transport the movable member 10 (in manner as described hereinafter).

At this point of time, the non-operating track portion 3B has no movable member 10 present therein and is in an empty condition. The stopper device 38 is in its stop position. More specifically, as shown by solid line in FIG. 6, the cylinder device 47 is operated so that the reciprocal element 46 shifts to the downstream side to cause the cam roller 45 to act on the cam face 44, whereby the link 41 is pivoted to its upstanding position to raise the stopper element 43.

Figure 7:
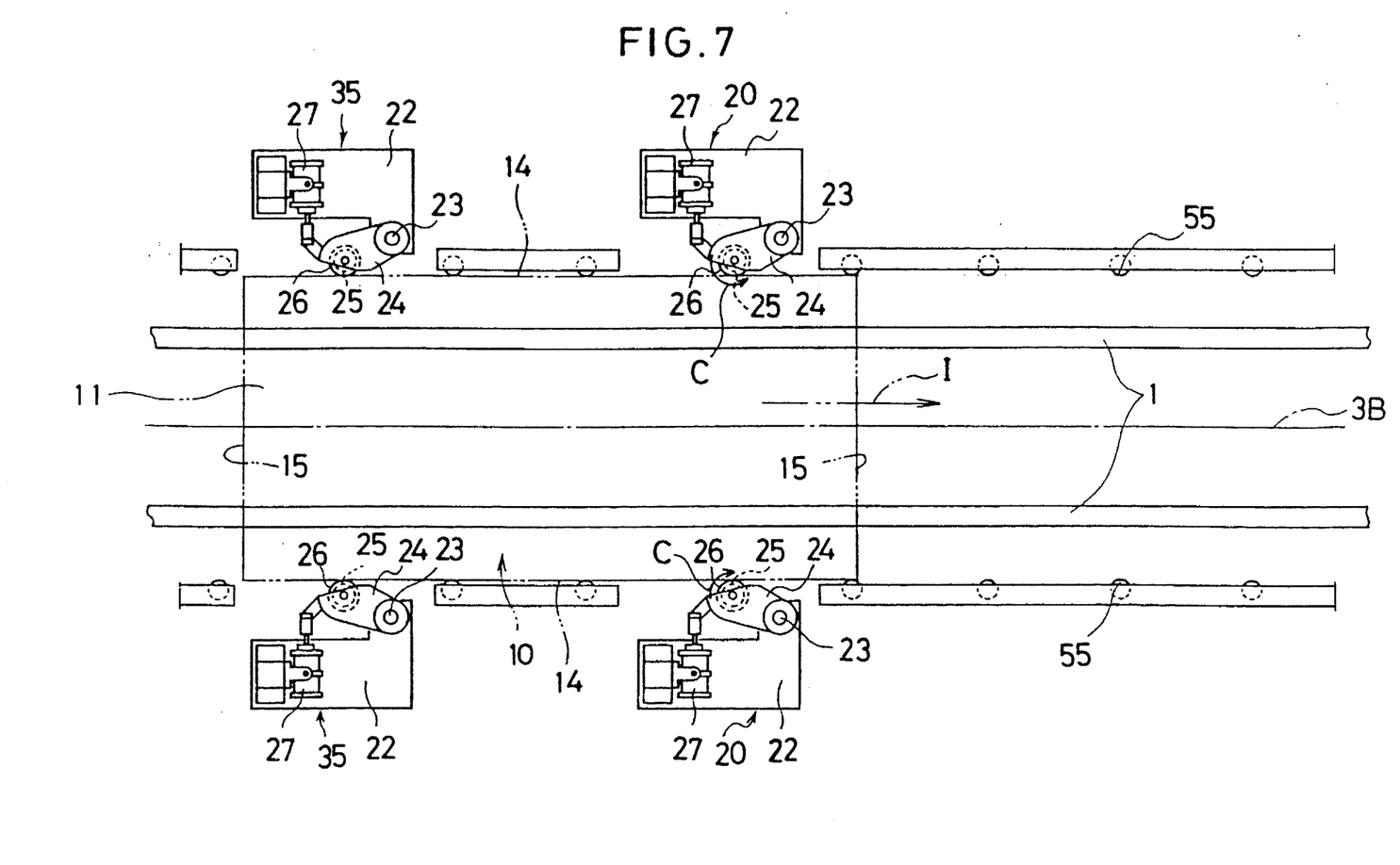
FIG. 7 is a plan view showing an accelerating device in the non-operating track portion.

Aforesaid lead-in operation of the lead-in device 35 ends when the leading end of the corresponding movable member 10 enters the accelerating device 20. At this point of time, the cylinder unit 27 of the accelerating device 20 is extended to pivot the support member 22 outwardly about the vertical axis, so that the forwarding roller 26 is moved away from the corresponding pressure receptor portion 14. Thus, forwarding (transport) of movable member 10 can be performed without any inconvenience.

After entry of movable member into position, the forwarding rollers 26 are operated reverse to move toward each other for abutment against pressure receptor portions 14. In this case, the forwarding rollers 26 are in rotation at high speed under the driving force of the servo motor 25. Therefore, when the forwarding rollers 26 which are in forced rotation are brought into abutment against the pressure receptor portions 14, the high-speed forward rotation force C of the rollers 26 is operative to apply a transport force to movable member 10, so that the movable member 10 is transported, as designated by the reference character I, at high speed on the horizontal non-operating track portion 3B.

The mobable member 10 which is in the course of return transport I at high speed in this way gradually becomes slowed down and, in the downstream portion of the non-operating track portion 3B, it enters the space between the decelerating devices in a slowed-down condition. At this point of time, the air motor 31 of the decelerating device 27 is in non-rotation state as its valve 33 is normally kept neutral, and the pressure receptor portions 14 of the movable member 10 which has been transported at high speed enter the space between the decelerating rollers 32 for abutment therewith. Then, the air motor 31 discharges air via a relief valve 34 while allowing the decelerating rollers 32 to rotate under the movement force of the movable member 10, so that it absorbs the movement energy of the movable member to rapidly decelerate the movable member 10. Subsequently, the movable member 10 comes to a stop as the front abutment face 15 thereof is caught by the stopper body 43 of the stopper device 38 and is thus stopped.

Figure 6:
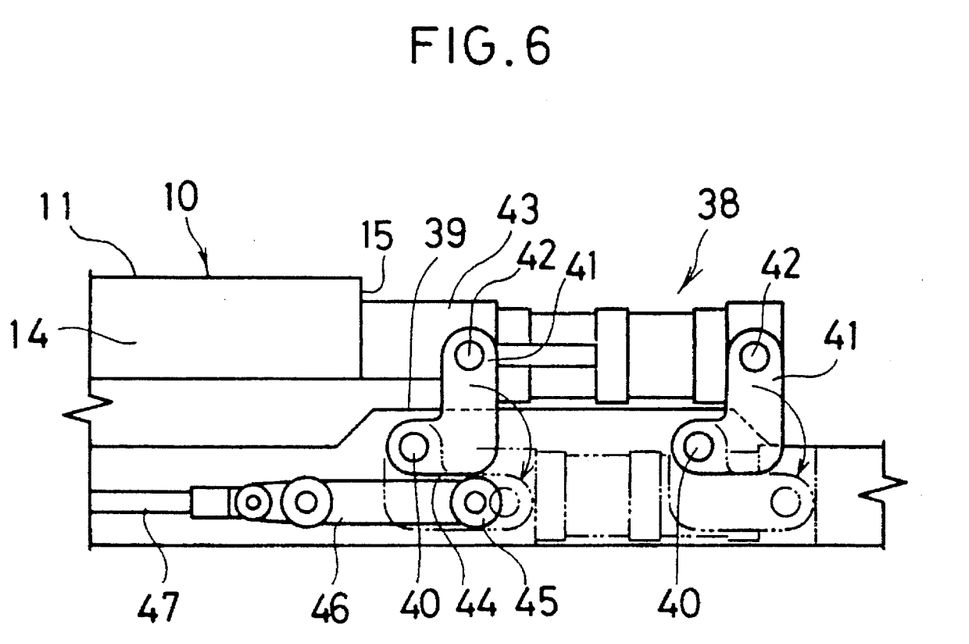
FIG. 6 is a side view showing a stopper device in the non-operating track portion.

Then, the cylinder unit 47 of the stopper device 38 is operated reverse to the aforesaid sequence to collapse the link 41, so that the stopper body 43 is lowered as shown in phantom in FIG. 6. In that condition, the selector valve 33 is switched over to drive the air motor 31 in order to enable the decelerating rollers 32 to produce low-speed forwarding rotation force D. Then, the movable member 10 thus forwarded is transferred onto the transfer rail 5 of the elevator unit 4 at its lowermost position in the upward transfer side transfer track portion 3D and is conveyed upward as the elevator unit 4 moves upward, until it is positioned opposite to the operating track portion 3A.

In the respective accelerating devices 20, lead-in devices 35, 36, 52, 53, forwarding devices 50, and braking devices 51, corresponding servo motors 37 are electrically synchronized, and in the braking devices 30 the corresponding airmotors 31 are synchronized through air piping.

Where the non-operating track portion 3B is long, any movable member 10 forwarded by the accelerating device 20 may not reach the decelerating device 30. In such a case, a relay unit 60 may be provided at one or more locations in a midportion of the non-operating track portion 3B, the relay unit being adapted to supply high-speed propulsive force to the movable member after deceleration thereof. The relay unit 60 comprises a decelerating device 30A, accelerating device 20A, and a stopper device 38A.

The provision of such relay unit 60 results in the movable member 10 forwarded by the accelerating device 20 being once decelerated by the decelerating device 30A of the relay unit 60, then stopped by the stopper device 38A, and again supplied with high-speed transport force by the accelerating device 20A. Thus, the movable member 10 is transported through the non-operating track portion 3B at high speed on a relay transport basis.

In the above described embodiment, forwarding rollers 26 and brake rollers 54 in accelerating device 20, lead-in devices 35, 36, 52, 53, forwarding device 50, and brake device 51 are all of the forced-drive type. Alternatively, forwarding roller 26 and brake roller 54 at one side may be of the forced-drive type, and feed roller 26 and brake roller 54 at the other side may be of the free-to-rotate type.

In the foregoing embodiment, guide means is in the form of rail 1, and movable member 10 is in the form of a truck. According to the invention, it may be arranged that movable member 10 in the form of a pallet is supported and guided by guide means of the roller conveyor type.

In the foregoing embodiment, each movable member 10 has pressure receptor portions formed on both sides thereof, and accelerating devices 20 and decelerating devices 30 are respectively arranged in laterally spaced apart relation. A pressure receptor portion 14 may be formed on one side of the movable member 10, and accelerating means 20 and decelerating means 30 may be provided on one side only.

In the foregoing embodiment, the predetermined track 3 consists of an operating track portion 3A provided at an upper level, a non-operating track portion 3B provided at a lower level, and a pair of transfer track portions 3C, 3D, the entire track being of a loop form when viewed in side elevation. The predetermined track 3, including any particular track (non-operating track portion 3B), may be of a straight-line configuration as a whole, or may be of a loop configuration in plan view.

The predetermined track 3 may have an operating track portion 3A at a lower level and a non-operating track portion 3B at an upper level. Movable member 10 may be of other than the truck or pallet type, for example, of such suspended transport type that the movable member is supported and guided by a ceiling side rail through a trolley device. In this case, for the ceiling side rail arrangement, one rail or a plurality of rails may be used.

What is claimed is:

1. A movable member transport arrangement, comprising a movable member supported and guided by guide means for movement on a predetermined track;

a pressure receptor portion formed on both sides of the movable member, right and left, to face laterally outward;

accelerating means disposed at the upstream side of a horizontally held particular track portion of the predetermined track to be adapted to act upon the pressure receptor portion to apply high speed transport force to the movable member;

decelerating means disposed at the downstream side of the horizontally held particular track portion of the predetermined track to be adapted to act upon the pressure receptor portion to decelerate the movable member;

said accelerating means and decelerating means each having a pair of rollers disposed on both sides of the particular track portion, right and left, at least one of said pair of rollers being a drive roller;

said particular track portion including the distance between said accelerating means and said decelerating means so defined as to be longer than the length of two movable members together, whereby a single movable member is capable of moving therebetween in the particular track portion at a high speed by the high speed transport force transmitted from the accelerating means; and stopper means disposed on the downstream side of the decelerating means to be adapted for abutment by the movable member which has been transported at a high speed and then decelerated by the decelerating means.

2. A movable member transport arrangement as set forth in claim 1, comprising a relay means provided between the accelerating means and the decelerating means in the horizontally held particular track portion, whereby the single movable member moving therebetween at a high speed by the high speed transport force transmitted from the accelerating means is decelerated and then applied with the high speed transport force to move toward the decelerating means at a high speed.

3. A movable member transport arrangement as set forth in claim 1, wherein the predetermined track includes an operating track portion and a horizontally held non-operating track portion, with accelerating means disposed at the upstream side of the non-operating track portion and decelerating means disposed at the downstream side thereof.

4. A movable member transport arrangement as set forth in claim 1, wherein the predetermined track is formed in the shape of a loop consisting of an operating track portion and a horizontally held non-operating track portion which are arranged in vertically spaced parallel relation, and vertically extending transfer track portions which connect respective beginning and ending terminals of the operating and non-operating track portions, with accelerating means disposed at the upstream side of the non-operating track portion and decelerating means disposed at the downstream side thereof.

5. A movable member transport arrangement as set forth in claim 2, wherein the predetermined track includes an operating track portion and a horizontally held non-operating track portion, with accelerating means disposed at the upstream side of the non-operating track portion and decelerating means disposed at the downstream side thereof.

6. A movable member transport arrangement as set forth in claim 2, wherein the predetermined track is formed in the shape of a loop consisting of an operating track portion and a horizontally held non-operating track portion which are arranged in vertically spaced parallel relation, and vertically extending transfer track portions which connect respective beginning and ending terminals of the operating and non-operating track portions, with accelerating means disposed at the upstream side of the non-operating track portion and decelerating means disposed at the downstream side thereof.

* * * * *